Patented July 20, 1937

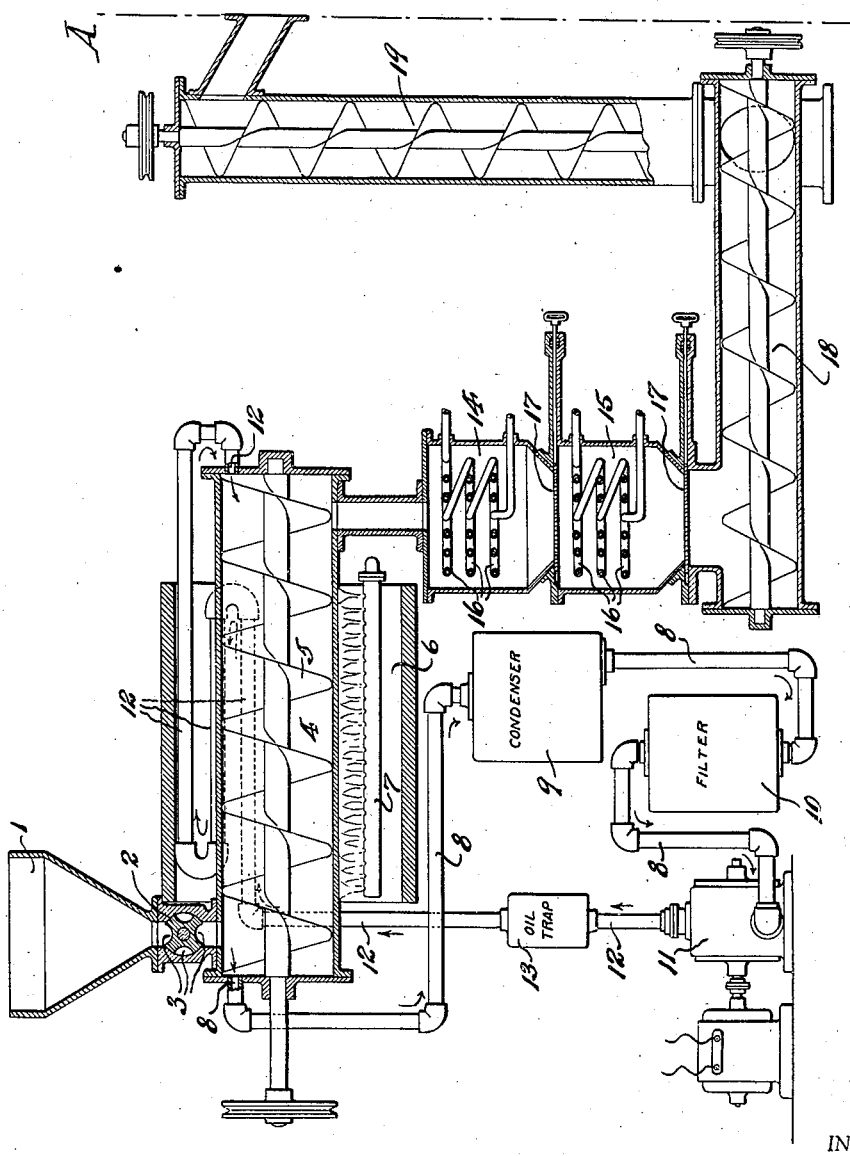

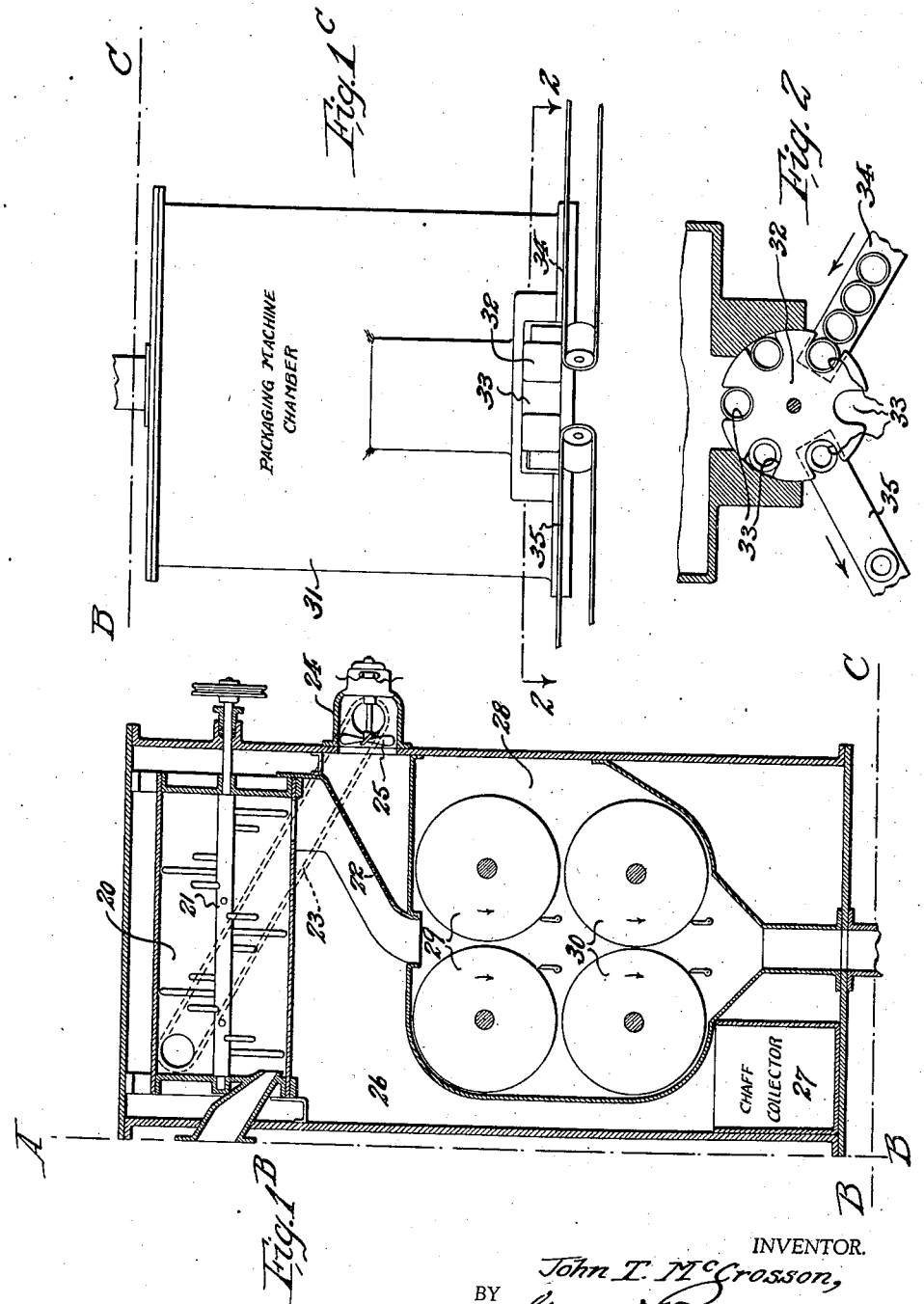

2,087,602

UNITED STATES PATENT OFFICE 2,087,602

COFFEE PROCESSING METHOD

John T. McCrosson, New York, N. Y.

Application January 21, 1936, Serial No. 61,649

11 Claims. (Cl. 99—68)

This invention relates to an improved method of processing coffee; and the invention has reference, more particularly, to a novel method of roasting coffee, which may also include the further steps of grinding and packaging the same.

It is well known to those familiar with coffee, that the coffee bean, before roasting, contains from 6 to 8.5% of reducing sugars, and from 11 to 14% of oils and has little or none of the aroma and other characteristics of freshly roasted coffee. In addition to the sugars, oils and fats there are other substances that are combined with the cellular structure of the bean and become an important part of the coffee upon roasting of the bean. During roasting, the sugar is for the most part caramelized and an aromatic volatile oil known as caffeol is developed by the torrefaction, on the presence of which the fragrance and taste or flavor of the coffee largely depends. Roasting also develops with the caffeol alluded to, a bitter soluble principle, and roasting also liberates a portion of the caffeine from its combination with the caffetannic acid. The aroma and flavor so desirable in coffee is not noticeable in the raw bean and is only developed by the roasting process. Due to the volatile character of the aromatic oil caffeol, the developed aroma and flavor begin to dissipate once the roasting is completed, and when the roasting and other succeeding processing steps are carried out under ordinary free atmospheric conditions much of these aroma and flavor producing principles are lost. It has been demonstrated that, when the roasting and roasted coffee is exposed to air, the escaping gases formed by the caramelized sugar, the volatilized caffeol and other constituents of the roasted coffee will more or less quickly reduce the flavor and aroma so that infusion of the coffee in use is neither agreeable to the palate nor exhilarating in its influence.

It is the main object of this invention to provide a novel process of roasting coffee, also including if desired the further processing steps of grinding and packaging the same, whereby the aroma and flavor producing principles are efficiently conserved and retained in the product to the very great enhancement of its flavor and stimulating effects when infused to form the ultimate beverage. To the end the roasting especially, and preferably the grinding and packaging processes, as well, are carried out in a special atmosphere, preferably under pressure, which is created by and impregnated with the aroma laden gases liberated in the roasting oven, whereby the coffee is constantly being basted or drenched by aroma laden gases, so that a very considerable portion of the liberated aroma and flavor producing principles are returned to and absorbed by the bean structure and the ground or fractured particles thereof, thus not only enriching the ultimate flavor of the finished product, but also restoring much of the weight thereof which would otherwise be lost.

Another object of this invention is to provide a novel method of processing coffee as above characterized, whereby, additionally, various impurities and undesirable constituents of the raw bean are removed from the special basting or drenching atmosphere, and consequently from the ultimate coffee product.

Other objects of this invention, not at this time more particularly enumerated, will become apparent in the following detailed description of the same.

Reference may be had to the accompanying drawings, in which illustrative forms of apparatus, utilized in carrying out the novel method or process according to this invention, are schematically shown; in which drawings Fig. 1$^A$, 1$^B$ and 1$^C$ are to be read together as showing interconnected successive instrumentalities, Fig. 2 being a fragmentary sectional view, taken on line 2—2 in Fig. 1$^C$.

The novel method or process according to this invention is preferably carried on as a continuous operation, and to this end the raw coffee beans are discharged from a storage bin to feed hopper 1, connected by a rotated admission lock 2, the peripheral lock chambers 3 of which successively transmit quantities of the beans from the hopper for discharge into the receiving end of a hermetically sealed roasting oven 4. Suitable means, such e. g. as the rotary spiral conveyer 5, is provided within said oven 4 for slowly moving the raw beans therethrough, while the same are subjected to torrefaction, and so that, as roasting is completed, the same are discharged from the oven. Oven 4 is surrounded by a suitable fire-box or burner inclosure 6, through the lower portion of which extends beneath oven 4 a suitable burner means 7 for applying heat to the latter. Connected in communication with the interior of oven 4, preferably at or adjacent to the coffee bean receiving end thereof, is a conduit 8, which leads to condenser 9. From condenser 9 extends a continuation of conduit 8 which leads to a filter means 10, and a further continuation of conduit 8 leads from the filter means to the intake side of a pump 11. From the output side of pump 11 extends a return conduit 12, a portion of which is preferably looped back and forth through said fire-box or burner enclosure 6, to finally extend to and communicate with the interior of oven 4, preferably at or adjacent to the discharge end thereof. Included in the line of said return conduit 12 is an oil trap or separator means 13.

In the coffee roasting process as carried out by the aid of the above described or other suitable apparatus for circulating the special atmosphere (about to be described) under pressure through the interior of the oven 4, the raw beans are continuously introduced into the receiving end of oven 4 and slowly moved therethrough while subjected to torrefaction. Under torrefaction the beans expand and the water content thereof is vaporized and driven therefrom. At the same time caffeol is formed, and, by reason of its volatile character, much thereof is also driven off, together with other oils, fats or waxes the removal of most of the latter constituents being really desirable. These emanations collect in the hermetically sealed interior of the oven 4, and from thence are drawn therefrom, by the action of the pump 11, through the conduit 8, passing through the condenser 9, wherein the water content or constituent of these emanations is condensed and removed, and thence passing through the filter means 10 wherein heavy oils and waxes as well as other undesirable elements are removed. The aromatic gases, thus purified, are driven by pump 11 back through return conduit 12 into the interior of oven 4. During such return the aromatic gases are, before delivery again into the oven interior, raised in temperature again while traversing the hot sections of the return conduit located within the fire-box or burner inclosure 6. The action of the pump 11 is also utilized to keep the aromatic gases within the oven 4 under more or less pressure.

From the above it will be obvious that the torrefaction of the raw beans within the oven interior is carried on in the presence of a special atmosphere consisting for the most part of aroma laden gases comprising the fumes or vapors of caffeol upon which so largely depend the ultimate aroma and flavor of properly roasted coffee. In effect the roasting coffee within the oven is constantly being basted or drenched by said aroma laden gases so that much of the aroma and flavor producing principles are returned to and are taken up or reabsorbed by the cellular structure of the coffee bean, while at the same time more or less compensation of weight loss, which is ordinarily attendant upon shrinkage of the beans by the roasting, is obtained.

Upon completion of torrefaction, which is attained by the time the coffee reaches the discharge end of oven 4, the roasted beans are subjected to a cooling operation. To this end the roasted beans are discharged from the oven for passage through air tight cooling chambers 14 and 15 equipped with interiorly disposed cooling tubes 16 through which a relatively cold fluid is circulated and over and in contact with which the roasted coffee passes. The first cooling chamber 14 is directly connected in communication with the interior of oven 4 at the discharge point of the latter, so that the aromatic gaseous atmosphere provided for the oven is also communicated to and fills the cooling chamber interior. The discharge end of the first cooling chamber 14 communicates with the receiving end of the second cooling chamber 15, a manipulatable air tight gate or closure 17 being provided at the discharge ends of both said cooling chambers. Upon opening the gate or closure between cooling chambers 14 and 15 coffee is discharged from the one to the other, and the aromatic gaseous atmosphere is also communicated to and fills the interior of the second cooling chamber 15. While chamber 15 is opened to discharge coffee, and communication between this chamber and chamber 14 is interrupted by closing of the intermediate gate, coffee may be discharged from chamber 15 while coffee is being discharged from oven to fill the first chamber 14. It will be obvious that the chambers are segregated from the outside atmosphere, and are filled with the special atmosphere constituted by the aromatic gases referred to, so that during the coffee cooling step the roasted beans continue to be drenched with such aromatic gases, and continue to reabsorb the same to the enhancement of desired aroma and flavor developed by the roasting.

Upon cooling the coffee is ready to be dechaffed and then ground, and these processing steps according to my invention are likewise carried out while still retaining the coffee free from contact with outside air but still subjected to the continued drenching action of the special atmosphere constituted by the aromatic gases obtained during the initial roasting step. To this end the cooled coffee beans are transferred from the coolers through and by means of suitable air tight conveyers, such e. g. as indicated by the reference characters 18 and 19 to and through which said aromatic gaseous atmosphere is also extended from the oven and cooling chambers into an air tight dechaffing drum 20. The dechaffing drum is provided with suitable means 21 for agitating the coffee beans entered thereinto by the conveyers 18—19, while at the same time progressively advancing the beans for discharge from said drum: During this agitation any particles of parchment, silver skin, etc. still carried by the beans are rubbed off and discharged with the coffee to a perforate screening chute 22 leading to the grinding rolls. To separate the chaff from the beans, a blast or current of the special aromatic atmosphere is passed through the screening chute 22 to winnow away the chaff. To effect such blast or current a conduit 23 is connected in communication with the interior of the drum 20 which receives the aromatic atmosphere from the oven and coolers through the enclosed conveyers. The opposite end of said conduit 23 communicates with the intake of a fan housing 24 in which is arranged a rapidly rotated fan 25. This fan 25 is located behind the screening chute 22 and serves to drive an accelerated current of the aromatic gaseous atmosphere across and through the coffee beans moving through the chute, thus winnowing out the chaff and discharging the same through a suitably formed air tight passage 26 for deposit in a collector 27.

Housed in an air tight chamber 28 is a suitable coffee grinding means, such e. g. as the successive pairs of grinding rolls 29 and 30. The screening chute 22 delivers the roasted and cleaned coffee beans for passage between the said grinding rolls, whereby the coffee is ground preparatory to packaging. Inasmuch as the chamber 28 is in communication with the herebefore described apparatus, the aromatic gaseous atmosphere still accompanies the coffee, and consequently the latter is ground in the presence of such atmosphere and is still isolated from contact by ordinary or outside air. This being the case the coffee beans as ground are continued to be drenched with the aromatic gases, and continue to absorb during the grinding step the flavor and aroma imparting principles from said gases.

Housed in an air tight chamber 31 which communicates with the grinding chamber 28 is any suitable form of packaging apparatus (not shown) to which the ground coffee is delivered. The aromatic gaseous atmosphere is also communicated to the interior of said packaging chamber 31, so that the packaging operations are also carried on in the presence of the aromatic gases composing the special atmosphere, so that the coffee is still isolated from contact with ordinary or outside air. Empty containers to receive the coffee may be delivered into the packaging chamber, subject to the operations of filling and sealing, and thereupon the filled and sealed containers may be discharged from the packaging chamber through any suitable arrangement of air lock means, such e. g. as the rotating lock member 32 having the peripheral lock chambers 33, which cooperate with container delivery conveyer means 34 and container discharge conveyer means 35.

From the above description it will be obvious that by my novel method of processing coffee, the coffee is roasted under pressure in a special atmosphere comprising aromatic gases generated by the roasting process, and circulated through the oven, and in turn accompanying the coffee through the various other processing steps right up to the moment of depositing the coffee in and sealing the same into suitable packages. By this method, the coffee is constantly and continuously drenched with the aromatic gases so as to be impregnated therewith to the very great improvement and conservation of its aroma and flavor. A further advantage of my novel method lies in the saving in the shrinkage weight of the roasted coffee due to the bean being roasted under a continuous pressure of the gases generated during the roasting operation; this saving runs to from 3 to 4 per cent.

Having thus described my invention, I claim:—

1. A method of processing coffee, comprising roasting the raw beans in a sealed oven, collecting the gaseous vapors emanating from the torrefied beans, substantially purifying said gaseous vapors, and circulating the same under pressure through the oven in contact with the beans.

2. A method of processing coffee, comprising roasting raw beans, then successively cooling and grinding the roasted beans, all in the presence of a special atmosphere under pressure formed by substantially purified gaseous vapors emanating from the torrefied beans.

3. A method of processing coffee, comprising progressively roasting raw beans in a sealed oven having external heating means, then successively cooling and packaging the roasted beans, all in the presence of a special atmosphere under pressure formed from substantially purified gaseous vapors emanating from the torrefied beans.

4. A method of processing coffee, comprising roasting raw beans, then successively cooling and grinding the roasted beans and finally packaging the ground beans, all in the presence of a special atmosphere under pressure formed from substantially purified gaseous vapors emanating from the torrefied beans.

5. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, and then successively cooling and grinding the roasted beans in sealed chambers to which said special aromatic gaseous atmosphere is communicated under pressure from said oven.

6. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, and then successively cooling and packaging the roasted beans in sealed chambers to which said special aromatic gaseous atmosphere is communicated under pressure from said oven.

7. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, and then successively cooling and grinding the roasted beans and finally packaging the ground beans in sealed chambers to which said special aromatic gaseous atmosphere is communicated under pressure from said oven.

8. A method of processing coffee, comprising roasting the raw beans in a sealed oven, collecting the gaseous vapors emanating from the torrefied beans, substantially purifying said gaseous vapors for recirculation under pressure through the oven in contact with the beans roasting, and preheating said gaseous vapors prior to return thereof into said oven.

9. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, preheating the purified gaseous vapors prior to return thereof to said oven, and then successively cooling and grinding the roasted beans in sealed chambers to which said aromatic gaseous atmosphere is communicated under pressure from said oven.

10. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, preheating the purified gaseous vapors prior to return thereof to said oven, and then successively cooling and packaging the roasted beans in sealed chambers to which said aromatic gaseous atmosphere is communicated under pressure from said oven.

11. A method of processing coffee, comprising progressively roasting the raw beans in a sealed oven, collecting the gaseous vapors emanating from the torrefied beans, substantially purifying said gaseous vapors and returning the same under pressure to the oven interior to form and maintain therein a special aromatic gaseous atmosphere, preheating the purified gaseous vapors prior to return thereof to said oven, and then successively cooling and grinding the roasted beans and finally packaging the ground beans in sealed chambers to which said aromatic gaseous atmosphere is communicated under pressure from said oven.

JOHN T. McCROSSON.